(12) United States Patent
Takahashi et al.

(10) Patent No.: US 12,210,341 B2
(45) Date of Patent: Jan. 28, 2025

(54) MODEL LEARNING SYSTEM, CONTROL DEVICE FOR VEHICLE, AND MODEL LEARNING METHOD

(71) Applicant: TOYOTA JIDOSHA KABUSHIKI KAISHA, Toyota (JP)

(72) Inventors: Yuki Takahashi, Susono (JP); Kazuki Fujii, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 591 days.

(21) Appl. No.: 17/481,761

(22) Filed: Sep. 22, 2021

(65) Prior Publication Data

US 2022/0113719 A1    Apr. 14, 2022

(30) Foreign Application Priority Data

Oct. 9, 2020   (JP) ................................ 2020-171427

(51) Int. Cl.
| | |
|---|---|
| *G05B 23/02* | (2006.01) |
| *G06N 20/00* | (2019.01) |
| *G07C 5/00* | (2006.01) |

(52) U.S. Cl.
CPC ....... *G05B 23/0283* (2013.01); *G05B 23/024* (2013.01); *G06N 20/00* (2019.01); *G07C 5/006* (2013.01)

(58) Field of Classification Search
None
See application file for complete search history.

(56) References Cited

U.S. PATENT DOCUMENTS

| | | | |
|---|---|---|---|
| 2017/0278312 A1* | 9/2017 | Minster ................. | G07C 5/006 |
| 2019/0192962 A1* | 6/2019 | Kasuno ................. | A63F 13/245 |
| 2019/0303886 A1* | 10/2019 | Kikinis ................. | H04L 9/0637 |
| 2019/0344773 A1 | 11/2019 | Kato et al. | |
| 2020/0035098 A1* | 1/2020 | Vozar ............... | G08G 1/096783 |
| 2021/0192450 A1* | 6/2021 | Bachant ............. | G06Q 10/0875 |
| 2021/0256420 A1* | 8/2021 | Elisha ..................... | G06N 5/04 |
| 2022/0043441 A1* | 2/2022 | Huang ................. | H04L 63/123 |

FOREIGN PATENT DOCUMENTS

| | | |
|---|---|---|
| JP | 2011-80480 A | 4/2011 |
| JP | 2019-196762 A | 11/2019 |

* cited by examiner

*Primary Examiner* — James J Lee
*Assistant Examiner* — David Hatch
(74) *Attorney, Agent, or Firm* — Oblon, McClelland, Maier & Neustadt, L.L.P.

(57) ABSTRACT

A model learning system comprises a server and a plurality of vehicles having control devices configured to be able to communicate with the server and configured to perform learning related control relating to machine learning. The server is configured to judge if among the plurality of vehicles, there is a specific vehicle mounting a repair part scheduled for repair, a replacement part scheduled for replacement, or an outdated part and, when there is a specific vehicle, to transmit an instruction to the specific vehicle to stop learning related control. The control device is configured so that, when receiving a stop instruction, it makes the learning related control stop.

10 Claims, 7 Drawing Sheets

MODEL LEARNING SYSTEM, CONTROL DEVICE FOR VEHICLE, AND MODEL LEARNING METHOD

FIELD

The present disclosure relates to a model learning system, a control device for a vehicle, and a model learning method.

BACKGROUND

Japanese Unexamined Patent Publication No. 2011-80480 discloses, as a conventional control device of an internal combustion engine, one configured to use an estimated value of atmospheric pressure calculated based on an intake pressure for training a correction value used when determining a target opening degree of an ISC (idle speed control) valve and, if an intake pressure sensor or an ECU performing processing for estimating the atmospheric pressure malfunctions, due to the high probability of the estimated value of the atmospheric pressure being mistaken, prohibits training of the correction value so as to prevent wasteful training.

SUMMARY

Even if no clear malfunction has occurred in a part mounted in a vehicle, if the vehicle mounts a part scheduled to be repaired or scheduled to be replaced or an outdated part of an old type, if performing control related to machine learning in the vehicle, the control would be liable to end up being wasted.

The present disclosure was made focusing on such a problem and has as its object to keep control for training a vehicle from ending up being wasted.

To solve this problem, the machine learning system according to one aspect of the present disclosure is provided with a server and a plurality of vehicles having control devices configured to be able to communicate with the server and configured to perform learning related control relating to machine learning. The server is configured to judge if, among the plurality of vehicles, there is a specific vehicle mounting a repair part scheduled for repair, a replacement part scheduled for replacement, or an outdated part of a part type older than the part type of the same part mounted in current vehicles and, when there is a specific vehicle, to transmit an instruction to the specific vehicle to stop learning related control. When receiving a stop instruction, the control device of a vehicle is configured to make the learning related control stop.

Further, a control device for a vehicle according to another aspect of the present disclosure is configured to be able to communicate with a server and configured to perform learning related control relating to machine learning and is configured to judge based on information received from the server if it mounts a repair part scheduled for repair, a replacement part scheduled for replacement, or an outdated part of a part type older than the part type of the same part mounted in current vehicles and, when mounting at least one part among these parts, makes the learning related control stop.

Further, a model learning method according to another aspect of the present disclosure is a model learning method by a model learning system provided with a server and a plurality of vehicles having control devices configured to be able to communicate with the server and configured to perform learning related control relating to machine learning, comprising a first step of judging by the server if, among the plurality of vehicles, there is a specific vehicle mounting a repair part scheduled for repair, a replacement part scheduled for replacement, or an outdated part of a part type older than the part type of the same part mounted in current vehicles, a second step, when the server judges that there is a specific vehicle, of transmitting an instruction from the server to the specific vehicle to stop learning related control, and, a third step of making the learning related control by the control device receiving the stop instruction stop.

According to these aspects of the present disclosure, it is possible to keep control relating to machine learning from ending up being unnecessarily performed in a vehicle.

DESCRIPTION OF EMBODIMENTS

Below, referring to the drawings, an embodiment of the present disclosure will be explained in detail. Note that, in the following explanation, similar component elements will be assigned the same reference notations.

First Embodiment

Figure 1:
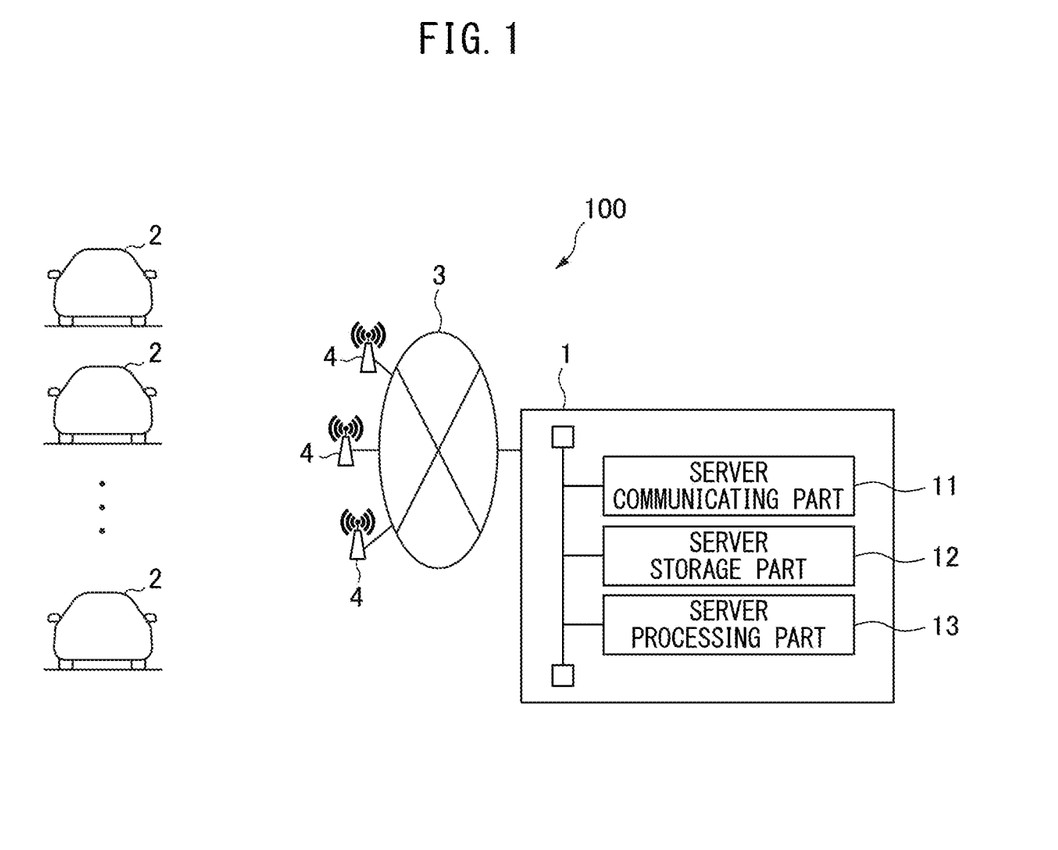
FIG. 1 is a schematic view of the configuration of a model learning system according to a first embodiment of the present disclosure.

FIG. 1 is a schematic view of the configuration of a model learning system 100 according to a first embodiment of the present disclosure.

The model learning system 100 according to the present embodiment is provided with a server 1 and a plurality of vehicles 2.

The server 1 is provided with a server communicating part 11, a server storage part 12, and a server processing part 13.

The server communicating part 11 is a communication interface circuit for connecting the server 1 with a network 3 through for example a gateway etc. and is configured to enable two-way communication with the vehicles 2.

The server storage part 12 has an HDD (hard disk drive) or optical recording medium, semiconductor memory, or other storage medium and stores the various types of computer programs and data etc. used for processing at the server processing part 13.

The server processing part 13 has one or more processors and their peripheral circuits. The server processing part 13 runs various types of computer programs stored in the server storage part 12 and comprehensively controls the overall operation of the server 1 and is, for example, a CPU (central processing unit).

The vehicle 2 may be a vehicle provided with only an internal combustion engine as the motive power source or may be a hybrid vehicle or plug-in hybrid vehicle or electric motor vehicle (electric vehicle or fuel cell vehicle etc.) Further, the vehicle 2 may be an autonomously driven vehicle configured so that driving operations relation to acceleration, steering, and braking are automatically performed.

Figure 2:
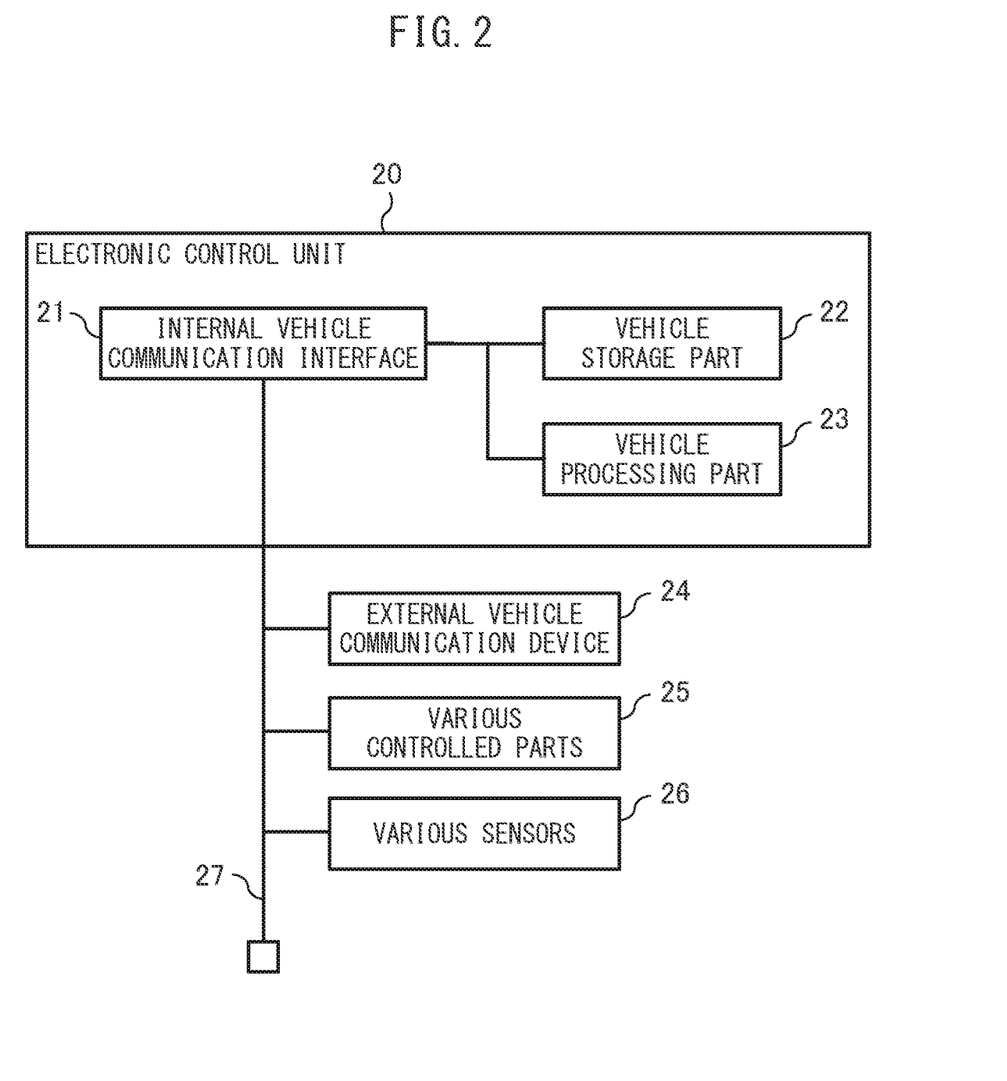
FIG. 2 is a schematic view showing part of a hardware configuration of a vehicle according to the first embodiment of the present disclosure.

FIG. 2 is a schematic view showing part of the hardware configuration of the vehicle 2.

The vehicle 2 is provided with an electronic control unit 20, external vehicle communication device 24, for example an internal combustion engine or electric motor, air-conditioner, an HMI (human machine interface) device including a display arranged at a position which a vehicle passenger can view, or other various controlled parts 25 mounted in the vehicle 2, and various types of sensors 26 required for controlling the various types of controlled parts 25 or detecting measured values of input parameters and output parameters of the later explained learning model. The electronic control unit 20, external vehicle communication device 24, and various types of controlled parts 25 and sensors 26 are connected with each other through an internal vehicle network 27 compliant with the CAN (Controller Area Network) or other standard.

The electronic control unit 20 is provided with an interior vehicle communication interface 21, vehicle storage part 22, and vehicle processing part 23. The interior vehicle communication interface 21, vehicle storage part 22, and vehicle processing part 23 are connected with each other through sign al wires.

The interior vehicle communication interface 21 is a communication interface circuit for connecting the electronic control unit 20 to the internal vehicle 27 based on the CAN (Controller Area Network) or other standard.

The vehicle storage part 22 has an HDD (hard disk drive) or optical recording medium, semiconductor memory, or other storage medium and stores the various types of computer programs and data etc. used for processing at the vehicle processing part 23.

The vehicle processing part 23 has one or more processors and their peripheral circuits. The vehicle processing part 23 runs various types of computer programs stored in the vehicle storage part 22, comprehensively controls the various types of controlled parts mounted in the vehicle 2, and is, for example, a CPU.

The external vehicle communication device 24 is a vehicle-mounted terminal having a wireless communication function. The external vehicle communication device 24 accesses a wireless base station 4 (see FIG. 1) connected with the network 3 (see FIG. 1) through a not shown gateway etc. and is connected with the network 3 through the wireless base station 4. Due to this, two-way communication is performed with the server 1.

In each vehicle 2, in control of the various controlled parts 25 mounted in the vehicle 2 by the electronic control unit 20, for example, a learning model (artificial intelligence model) performing machine learning or other learning is used in accordance with need. In the present embodiment, as the learning model, a neural network model (below referred to as an "NN model") using a deep neural network (DNN) or convolutional neural network (CNN) etc. which has been subjected to deep learning is used. Therefore, the learning model according to the present embodiment can be said to be a trained NN model subjected to deep learning. "Deep learning" is one of the machine learning techniques representative of artificial intelligence (AI).

Figure 3:
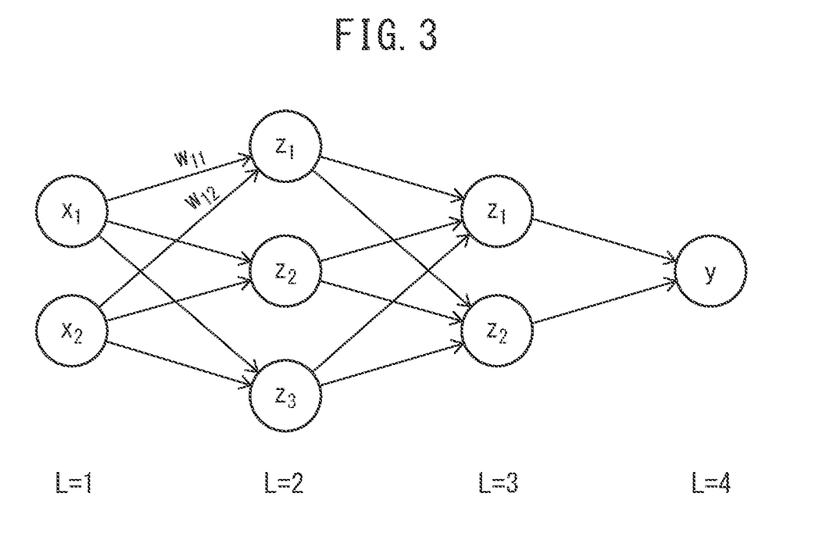
FIG. 3 is a view showing one example of a learning model according to the first embodiment of the present disclosure.

FIG. 3 is a view showing one example of a learning model (NN model) according to the present embodiment.

The circle marks in FIG. 3 show artificial neurons. The artificial neurons are usually called "nodes" or "units" (in the Description, they are called "nodes"). In FIG. 3, L=1 indicates an input layer, L=2 and L=3 indicate hidden layers, and L=4 indicates an output layer. The hidden layers are also called "intermediate layers". Note that, FIG. 3 illustrates an NN model with two hidden layers, but the number of hidden layers is not particularly limited. Further, the numbers of nodes of the layers of the input layer, hidden layers, and output layer are also not particularly limited.

In FIG. 3, $x_1$ and $x_2$ show the nodes of the input layer (L=1) and output values from the nodes while "y" shows the node of the output layer (L=4) and its output value. Similarly, $z_1^{(L=2)}$, $z_2^{(L=2)}$, and $z_3^{(L=2)}$, show nodes of the hidden layer (L=2) and output values from the nodes, while $z_1^{(L=3)}$ and $z_2^{(L=3)}$ show nodes of the hidden layer (L=3) and output values from the nodes.

At the nodes of the input layer, the inputs are output as they are. On the other hand, at the nodes of the hidden layer (L=2), output values $x_1$ and $x_2$ of the nodes of the input layer are input, while at the nodes of the hidden layer (L=2), the corresponding weights "w" and biases "b" are used to calculate sum input values "u". For example, in FIG. 3, a sum input value $u_k^{(L=2)}$ calculated at the node shown by $z_k^{(L=2)}$ (k=1, 2, 3) of the hidden layer (L=2) becomes like in the following formula (M is the number of nodes of the input layer).

$$u_k^{(L=2)} = \sum_{m=1}^{M} (x_m \cdot w_{km}^{(L=2)}) + b_k \qquad \text{[Mathematical 1]}$$

Next, this sum input value $u_k^{(L=2)}$ is converted by an activation function "f" and output as =the output value $z_k^{(L=2)}$ (=f($u_k^{(L=2)}$)) from the node shown by $z_k^{(L=2)}$ of the hidden layer (L=2). On the other hand, the nodes of the hidden layer (L=3) receive input of the output values $z_1^{(L=2)}$, $z_2^{(L=2)}$, and $z_3^{(L=2)}$ of the nodes of the hidden layer (L=2). At the nodes of the hidden layer (L=3), the respectively corresponding weights "w" and biases "b" are used to calculate the sum input values u(=Σz·w+b). The sum input values "u" are converted by an activation function in the same way and are output as the output values $z_1^{(L=3)}$ and $z_2^{(L=3)}$ from the nodes of the hidden layer (L=3). The activation function is, for example, a Sigmoid function σ.

Further, at the node of the output layer (L=4), the output values $z_1^{(L=3)}$ and $z_2^{(L=3)}$ of the nodes of the hidden layer (L=3) are input. At the node of the output layer, the respectively corresponding weights "w" and biases "b" are used to calculate the sum input value u(Σz·w+b) or only the respectively corresponding weights "w" are used to calculate the sum input value u(Σz·w). For example, at the node of the output layer, an identity function is used as the activation function. In this case, the sum input value "u"

calculated at the node of the output layer is output as is as the output value "y" from the output layer.

In this way, the learning model according to the present embodiment is provided with an input layer, hidden layers, and an output layer. If one or more input parameters are input from the input layer, one or more output parameters corresponding to the input parameters are output from the output layer.

As examples of the input parameters, for example, in the case of using a learning model to control an air-conditioner mounted in the vehicle 2, various parameters having an effect on the internal vehicle temperature such as the outside air temperature, the location of use of the vehicle 2 (latitude and longitude), time of day, and immediately preceding parked time (parked time before driving) may be mentioned. Further, as an example of output parameters corresponding to such input parameters, the temperature setting of the air-conditioner may be mentioned. Due to this, by controlling the air-conditioner to the temperature setting acquired as an output parameter, it is possible to maintain the internal vehicle temperature at a suitable temperature.

Further, as an example of the input parameters, for example, if using a learning model to control an internal combustion engine mounted in the vehicle 2, current values of the engine rotational speed or engine cooling water temperature, amount of fuel injection, fuel injection timing, fuel pressure, amount of intake air, intake temperature, EGR rate, and supercharging pressure and other such parameters showing the operating state of the internal combustion engine may be mentioned. Further, as examples of output parameters corresponding to such input parameters, the estimated values of the $CO_2$ concentration and NOx concentration in the exhaust, the concentration of other substances, the engine output torque, and other various parameters representative of the performance of the internal combustion engine may be mentioned. Due to this, by inputting into the NN model the current values of various parameters showing the operating state of the internal combustion engine as input parameters, it is possible to acquire estimated values of various parameters representative of the performance of the internal combustion engine (current estimated values or future estimated values) as output parameters, so for example it is possible to control the internal combustion engine based on the output parameters so that the performance of the internal combustion engine approaches the desired performance. Further, if providing sensors etc. for measuring the output parameters, it is also possible to judge malfunctions of the internal combustion engine or sensors etc. by the difference between the measured values and estimated values.

To improve the precision of the learning model, it is necessary to train the learning model. For training the learning model, a large number of training data sets including measured values of input parameters and measured values of output parameters corresponding to the measured values of the input parameters (truth data) are used. By using the large number of training data sets and repeatedly updating the weights "w" and biases "b" in the neural network by known error backpropagation so that the difference between the values of the output parameters output from the learning model when inputting measured values of the input parameters and the measured values of the output parameters corresponding to the measured values of the input parameters becomes smaller, the values of the weights "w" and biases "b" are learned and the precision of the learning model is improved.

In this regard, depending on the state of the parts mounted in the vehicle 2, sometimes it is desirable to stop various control relating to the learning of the learning model (machine learning) used in the vehicle 2 (below, referred to as "learning related control"). Note that, as an example of learning related control, processing for preparing training data sets based on data obtained from the sensors 26, processing for actually using training data sets to train the learning model, processing for updating a learning model to a newly trained learning model, processing for sending and receiving data necessary for learning between the server 1 and the vehicle 2, etc. may be mentioned.

For example, if a part mounted in the vehicle 2 malfunctions, if using data obtained from the malfunctioning part to prepare the training data sets and train the learning model, the training would be liable to be unsuitable and the precision of the learning model would be liable to fall. For this reason, in the vehicle 2, if values obtained from a malfunctioning part were to be used to prepare the training data sets, it would be preferable to stop that processing.

Further, even if no clear malfunction has occurred in a part mounted in a vehicle 2, if the vehicle 2 mounted a part scheduled for repair or scheduled for replacement such as a recalled part, even if preparing training data sets based on data obtained from such a part, the training data sets would be useless after repair or after replacement of the part—not only for the vehicle itself, but also for other vehicles. Further, even if training the learning model relating to a part scheduled to be repaired or scheduled to be replaced, after repair or after replacement of the part, a learning model learning features of the part after repair or replacement would become necessary, so the learning model learning features of the part before repair or before replacement would be useless—not only for the vehicle itself, but also for other vehicles.

Further, if the vehicle 2 mounts an outdated part of an old type, the data obtained from the outdated part would sometimes be lower in precision compared with data obtained from the same part of a new type, so if preparing training data sets based on data obtained from such a low precision outdated part, the training data sets may become useless.

In this way, even if no clear malfunction has occurred in a part mounted in the vehicle 2, if the vehicle 2 mounts a part scheduled for repair or replacement or an outdated part, if performing learning related control at the vehicle 2, that control is liable to end up becoming useless. As a result, the limited processing resources of the server 1 or the electronic control unit 20 of the vehicle 2 would be wastefully used and power would be wastefully consumed.

Therefore, even if the vehicle 2 mounts a part scheduled to be repaired or scheduled to be replaced or an outdated part, it would be desirable to stop the learning related control in accordance with need. Here, the vehicle 2 can diagnose by itself whether a part mounted in it has malfunctioned. However, unlike with diagnosis of a malfunction of a part, the vehicle 2 cannot judge by itself whether a part mounted in it is a part scheduled for repair or scheduled for replacement or is an outdated part.

Therefore, in the present embodiment, the server 1 and the vehicle 2 communicate so as to enable learning related control to be stopped if a part mounted in the vehicle 2 is a part scheduled to be repaired or scheduled to be replaced or is an outdated part.

Figure 4:
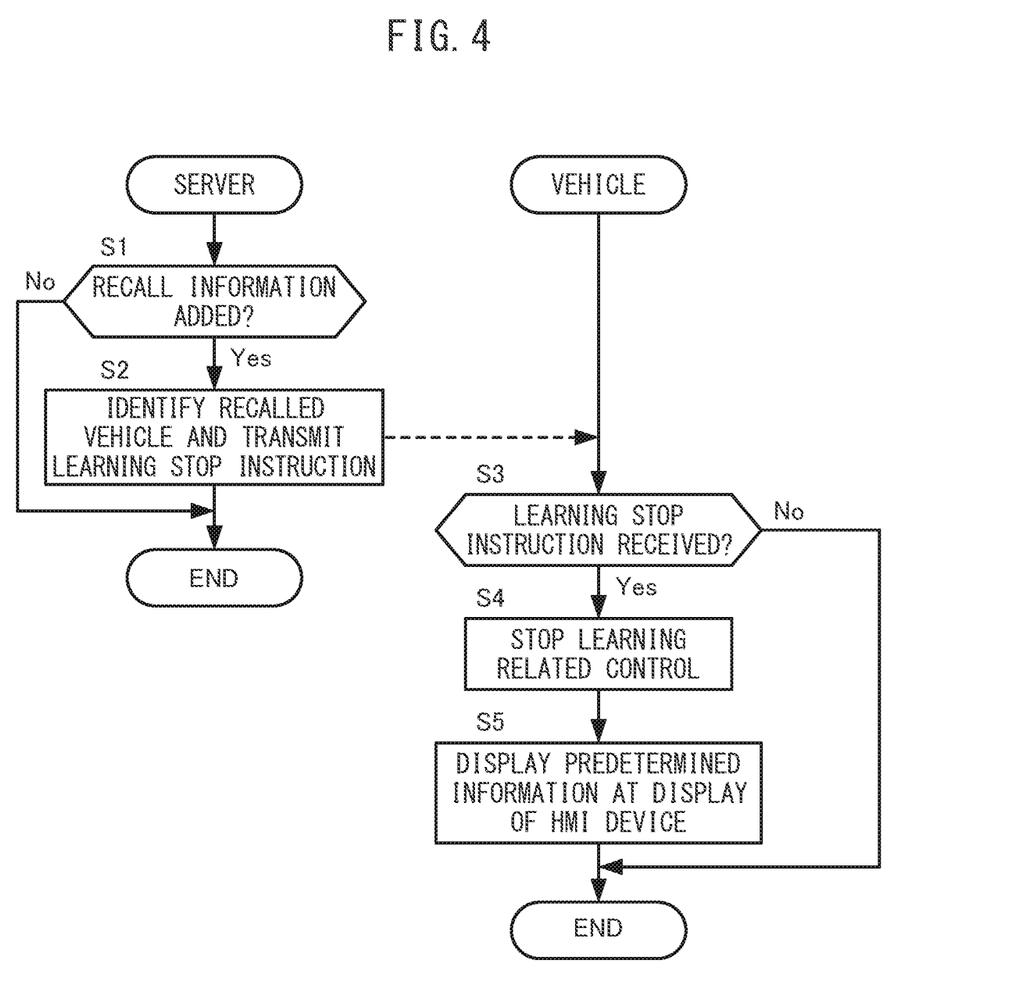
FIG. 4 is a flow chart showing one example of processing according to the first embodiment of the present disclosure performed between a server and a vehicle for stopping learning related control when a vehicle mounts a part scheduled for repair or replacement.

FIG. 4 is a flow chart showing one example of processing performed between the server 1 and the vehicle 2 in the model learning system 100 according to the present embodiment for stopping learning related control if the vehicle 2 mounts a recalled part as one example of a part scheduled to be repaired or scheduled to be replaced.

At step S1, the server 1 judges if new recall information has been added to a recall management database of the server storage part 12. The recall information, for example, includes the recall content, recalled part, the chassis number of the vehicle 2 mounting the recalled part (below, referred to as the "recalled vehicle"). If new recall information has been added to the recall management database, the server 1 proceeds to the processing of step S2. On the other hand, if new recall information has not been added to the recall management database, the server 1 ends the current processing.

At step S2, the server 1 identifies a recalled vehicle 2 based on the chassis number contained in the newly added recall information and transmits to the recalled vehicle 2 a learning stop instruction containing information relating to the details of the recall and the recalled part.

At step S3, the electronic control unit 20 of the vehicle 2 judges if it has received the learning stop instruction. If the electronic control unit 20 receives the learning stop instruction, it proceeds to the processing of step S4, while if it does not receive the learning stop instruction, it ends the current processing.

At step S4, the electronic control unit 20 of the vehicle 2 checks the recalled part contained in the learning stop instruction and stops the learning related control relating to the recalled part. The electronic control unit 20 stops the processing, for example, when having performed processing for preparing the training data sets based on data obtained from the recalled part. Further, the electronic control unit 20 stops the processing for training the learning model or the processing for updating a learning model to a newly trained learning model, for example, when there is a model relating to a recalled part in the learning models.

Note that in the present embodiment, in this way, only learning related control relating to a recalled part was stopped, but the invention is not limited to this. It is also possible to stop all learning related control across the board when receiving a learning stop instruction.

At step S5, the electronic control unit 20 of the vehicle 2 displays on the display of the HMI device the information to the effect of stopping learning related control and information to the effect of the vehicle itself being a recalled vehicle.

Figure 5:
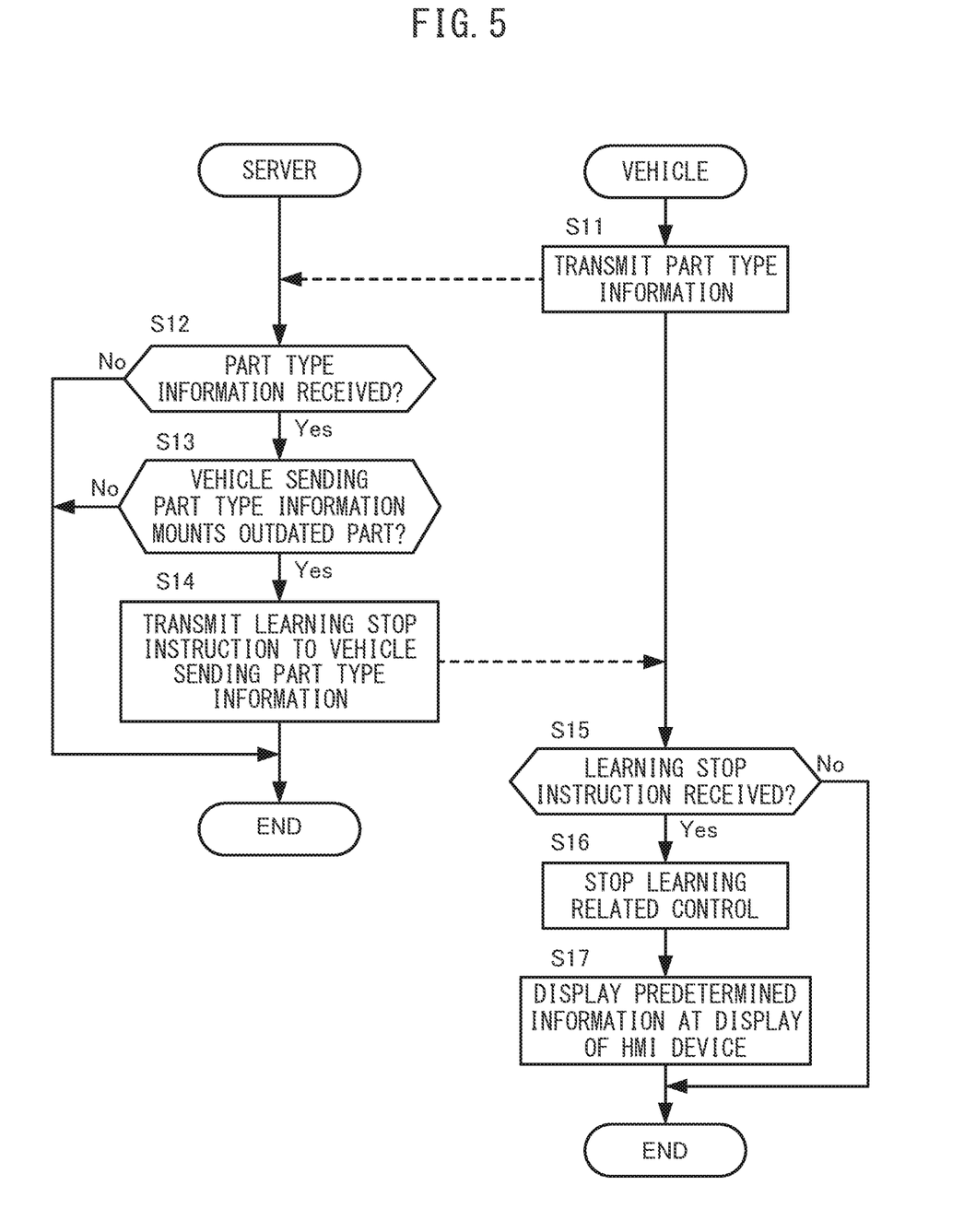
FIG. 5 is a flow chart showing one example of processing according to the first embodiment of the present disclosure performed between a server and a vehicle for stopping learning related control when a vehicle mounts an outdated part.

FIG. 5 is a flow chart showing one example of processing performed between the server 1 and the vehicle 2 in the model learning system 100 according to the present embodiment for stopping learning related control when the vehicle 2 mounts an outdated part.

At step S11, the electronic control unit 20 of the vehicle 2 transmits part type information of the parts mounted in its own vehicle to the server 1.

At step S12, the server 1 judges if it has received the part type information. If it has received the part type information, the server 1 proceeds to the processing of step S13. On the other hand, if it has not received the part type information, the server 1 ends the current processing.

At step S13, the server 1 refers to the part management database of the server storage part 12 and judges if the vehicle 2 transmitting the part type information mounts an outdated part. When judging that the vehicle 2 transmitting the part type information mounts an outdated part, the server 1 proceeds to the processing of step S14. On the other hand, when the vehicle 2 transmitting the part type information does not mount an outdated part, the server 1 ends the current processing.

At step S14, the server 1 transmits a learning stop instruction including information relating to the outdated part to the vehicle 2 transmitting the part type information.

At step S15, the electronic control unit 20 of the vehicle 2 judges if it has received a learning stop instruction. If it has received a learning stop instruction, the electronic control unit 20 proceeds to the processing of step S16, while if it has not received a learning stop instruction, it ends the current processing.

At step S16, the electronic control unit 20 of the vehicle 2 checks the outdated part included in the learning stop instruction and stops the learning related control relating to the outdated part. The electronic control unit 20, for example, stops the processing if it had been performing processing for preparing training data sets based on data obtained from the outdated part. Further, the electronic control unit 20, for example, stops the processing for training the learning model or the processing for updating a learning model to a newly trained learning model if there is a model relating to an outdated part in the learning models.

Note that in the present embodiment, in this way, only learning related control relating to an outdated part was stopped, but the invention is not limited to this. It is also possible to stop all learning related control across the board when receiving a learning stop instruction.

At step S17, the electronic control unit 20 of the vehicle 2 displays on the display of the HMI device the information to the effect of stopping learning related control.

The model learning system 100 according to the present embodiment explained above is provided with a server 1 and a plurality of vehicles 2 having electronic control units 20 (control devices) configured to be able to communicate with the server 1 and configured to perform learning related control relating to machine learning.

Further, the server 1 is configured to judge if among the plurality of vehicles 2, there is a vehicle 2 (specific vehicle) mounting a repair part scheduled for repair, a replacement part scheduled for replacement, or an outdated part of a part type older than the part type of the same part mounted in current vehicles and, when there is a specific vehicle 2, to transmit an instruction to the specific vehicle 2 to stop learning related control. Further, the electronic control unit 20 of the specific vehicle 2 is configured to make the learning related control stop when receiving a stop instruction.

Due to this, if the vehicle 2 mounts a part scheduled for repair or scheduled for replacement or an outdated part, it is possible to stop learning related control, therefore it is possible to keep learning related control from ending up being unnecessarily performed.

Further, in the present embodiment, the above-mentioned stop instruction contains information on the repair parts, replacement parts, or outdated parts. The electronic control unit 20 of the vehicle 2 is configured to make the learning related control relating to the parts contained in the stop instruction stop.

Due to this, it is possible to prevent even learning related control performed without regard as to the repair parts, replacement parts, or outdated parts from ending up being stopped.

Note that the present embodiment, if changing the perspective, can also be grasped as a model learning method by the model learning system 100. Specifically, it can be grasped as a model learning method comprising a first step of judging by the server 1 if, among the plurality of vehicles 2, there is a vehicle 2 (specific vehicle) mounting a repair part scheduled for repair, a replacement part scheduled for replacement, or an outdated part of a part type older than the part type of the same part mounted in current vehicles, a second step, when the server 1 judges that there is a vehicle 2 (specific vehicle), of transmitting an instruction from the server 1 to the vehicle 2 (specific vehicle) to stop learning related control, and a third step of making the learning related control by the electronic control unit 20 (control device) receiving the stop instruction stop.

Second Embodiment

Next, a second embodiment of the present disclosure will be explained. The present embodiment differs from the first embodiment on the point that each vehicle 2 judges based on external information transmitted from the server 1 whether it itself mounts a part scheduled for repair, a part scheduled for replacement, or an outdated part. Below, this point of difference will be focused on in the explanation.

Figure 6:
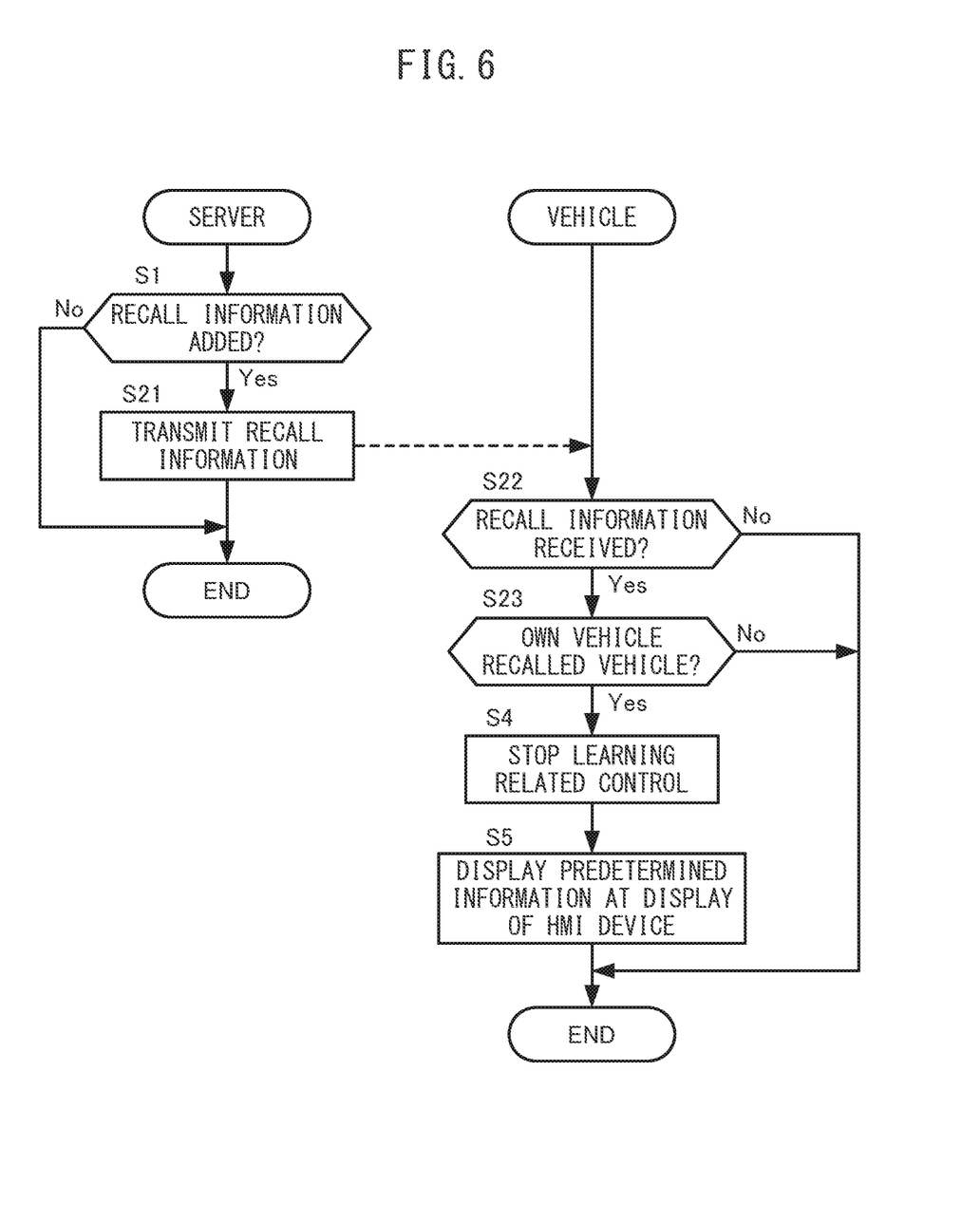
FIG. 6 is a flow chart showing one example of processing according to second embodiment of the present disclosure performed between a server and a vehicle for stopping learning related control when a vehicle mounts a part scheduled for repair or replacement.

FIG. 6 is a flow chart showing one example of processing performed between the server 1 and the vehicle 2 in the model learning system 100 according to the present embodiment for stopping learning related control if the vehicle 2 mounts a part scheduled for repair or scheduled for replacement (recalled part). Note that in FIG. 6, the contents of the processing of steps S1, S4, and S5 are similar to the first embodiment, so here the explanations will be omitted.

At step S21, the server 1 transmits the newly added recall information to each vehicle 2.

At step S22, the electronic control unit 20 of the vehicle 2 judges if it has received recall information. If it has received recall information, the electronic control unit 20 proceeds to the processing of step S4, while if it has not received recall information, it ends the current processing.

At step S23, the electronic control unit 20 of the vehicle 2 judges based on the recall information if the vehicle itself is a recalled vehicle. In the present embodiment, the electronic control unit 20 judges that the vehicle itself is a recalled vehicle if there is a chassis number matching the chassis number of the vehicle itself in the chassis numbers of recalled vehicles contained in the recall information. If judging that the vehicle itself is a recalled vehicle, the electronic control unit 20 proceeds to the processing of step S4, while if judging that the vehicle itself is not a recalled vehicle, it ends the current processing.

Figure 7:
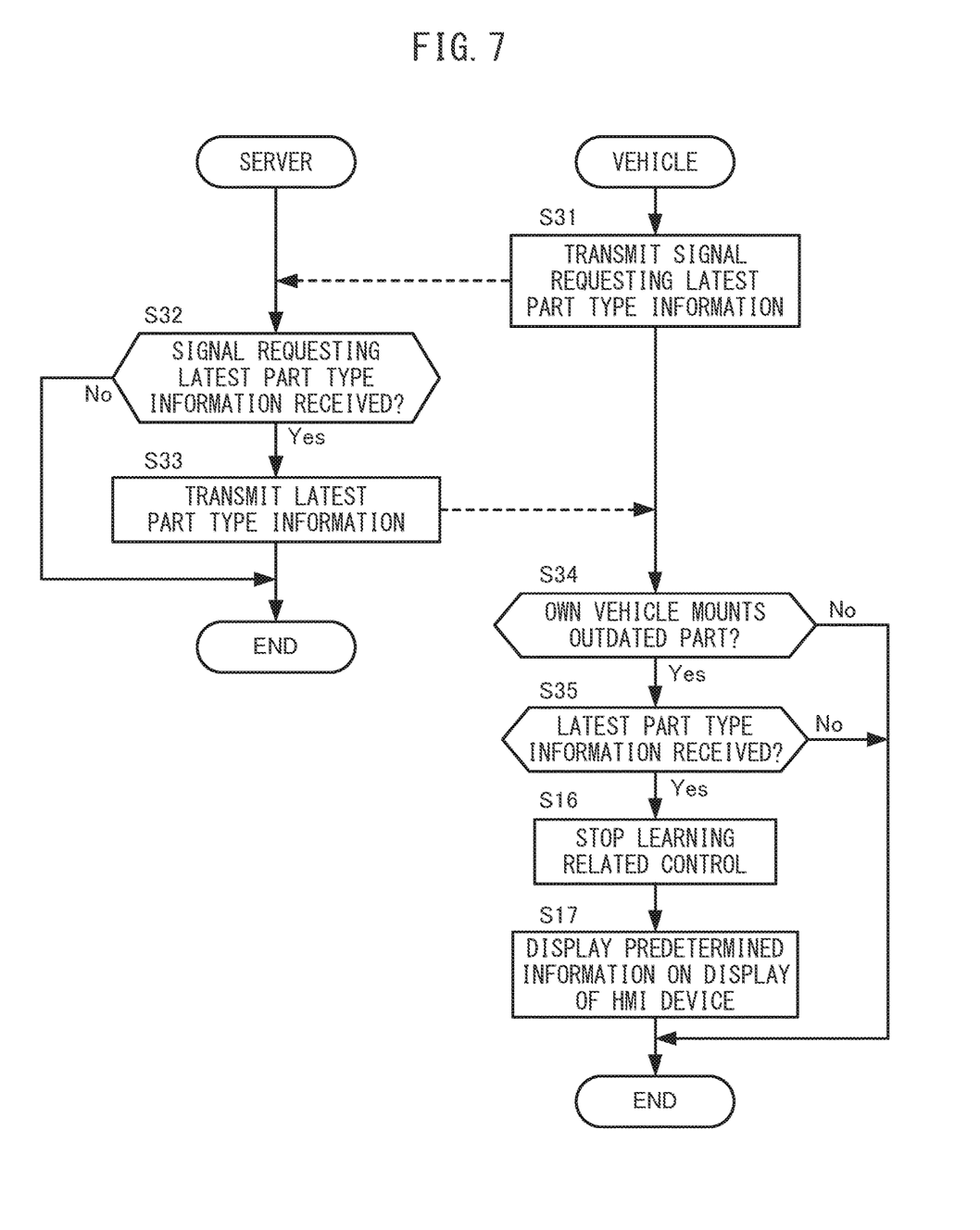
FIG. 7 is a flow chart showing one example of processing according to the second embodiment of the present disclosure performed between a server and a vehicle for stopping learning related control when a vehicle mounts an outdated part.

FIG. 7 is a flow chart showing one example of processing performed between the server 1 and the vehicle 2 in the model learning system 100 according to the present embodiment for stopping learning related control if the vehicle 2 mounts an old type part. Note that in FIG. 7, the contents of the processing of steps S16 and S17 are similar to the first embodiment, so here the explanations will be omitted.

At step S31, the electronic control unit 20 of the vehicle 2 transmits to the server 1 a signal requesting the latest part type information of the parts mounted in the vehicle itself.

At step S32, the server 1 judges if it has received a signal requesting the latest part type information. If it has received a signal requesting the latest part type information, the server 1 proceeds to the processing of step S33, while if it has not received it, it ends the current processing.

At step S33, the server 1 refers to the part management database of the server storage part 12 and transmits to the vehicle 2 sending the request signal the latest part type information of the parts mounted in that sending vehicle 2.

At step S34, the electronic control unit 20 of the vehicle 2 judges if it has received from the server 1 the latest part type information of the parts mounted in the vehicle itself. If it has received from the server 1 the latest part type information of the parts mounted in the vehicle itself, the electronic control unit 20 proceeds to the processing of step S35, while if it has not received it, it ends the current processing.

At step S35, the electronic control unit 20 of the vehicle 2 judges based on the latest part type information of the parts mounted in the vehicle itself received from the server 1 if the vehicle itself mounts an old type of part. If it judges that the vehicle itself mounts an old type of part, the electronic control unit 20 proceeds to the processing of step S16. On the other hand, if it judges that the vehicle itself does not mount an old type of part, the electronic control unit 20 ends the current processing.

The electronic control unit 20 (control device) of the vehicle 2 according to the present embodiment explained above is configured to be able to communicate with the server 1 and configured to perform learning related control relating to machine learning. Further, the electronic control unit 20 (control device) judges based on external information (recall information and latest part type information) received from the server 1 if it mounts a part scheduled for repair, a part scheduled for replacement, or an outdated part of a part type older than the part type of the same part mounted in current vehicles and, when mounting at least one part among these parts, makes the learning related control stop.

In this way, even if judging based on external information transmitted from the server 1 whether the vehicle itself mounts a part scheduled for repair, a part scheduled for replacement, or an outdated part, similar effects as with the first embodiment can be obtained.

Above, embodiments of the present disclosure were explained, but the embodiments only show some of the examples of application of the present disclosure and are not intended to limit the technical scope of the present disclosure to the specific constitutions of the embodiments.

The invention claimed is:

1. A model learning system, comprising:
   a server; and
   a plurality of vehicles each including a control device configured to communicate with the server and configured to perform learning related control relating to machine learning, wherein
   the server is configured to judge if among the plurality of vehicles, there is a specific vehicle including a repair part scheduled for repair, a replacement part scheduled for replacement, or an outdated part of a first part type older than a second part type of the same part mounted in other vehicles and, when there is a specific vehicle, to transmit a stop instruction to the specific vehicle to stop learning related control,
   when receiving the stop instruction, the control device is configured to stop the learning related control, and
   the learning related control includes processing a data set of the repair part, the replacement part, or the outdated part subject to the stop instruction.

2. The model learning system according to claim 1, wherein
   the stop instruction includes information of the repair part, the replacement part, or the outdated part, and
   the control device is configured to make the learning related control related to a part included in the stop instruction stop.

3. The model learning system according to claim 1, wherein the repair part and the replacement part are recalled parts.

4. A control device for a vehicle configured to communicate with a server and configured to perform learning related control relating to machine learning, wherein the control device judges based on information received from the server that the vehicle includes a repair part scheduled for repair, a replacement part scheduled for replacement, or an outdated part of a first part type older than the a second part type of the same part mounted in other vehicles and, when, including at least one of the repair part, the replacement part, or the outdated part configured to stop the learning related control, the learning related control including processing a data set of the repair part, the replacement part, or the outdated part.

5. A model learning method for a model learning system provided with a server and a plurality of vehicles each including a control device configured to communicate with the server and configured to perform learning related control relating to machine learning, the model learning method comprising:
 a first step of judging by the server if, among the plurality of vehicles, there is a specific vehicle including a repair part scheduled for repair, a replacement part scheduled for replacement, or an outdated part of a first part type older than a second part type of the same part mounted in other vehicles;
 a second step, when the server judges that there is a specific vehicle, of transmitting a stop instruction from the server to the specific vehicle to stop the learning related control; and
 a third step of stopping the learning related control by the control device receiving the stop instruction stop, the learning related control includes processing a data set of the repair part. the replacement part, or the outdated part subject to the stop instruction.

6. The model learning method according to claim 5, wherein
 the stop instruction includes information of the repair part, the replacement part, or the outdated part, and,
 in the third step, the control device makes the learning related control related to a part included in the stop instruction stop.

7. The model learning method according to claim 5, wherein the repair part and the replacement part are recalled parts.

8. The model learning system according to claim 1, wherein
 the learning related control further includes training a machine learning model based on the data set.

9. The model learning system according to claim 1, wherein
 the learning related control further includes at least one of sending and receiving the data set to or from the server.

10. The model learning system according to claim 1, wherein
 the learning related control further includes obtaining data for the data set from a sensor on the vehicle.

\* \* \* \* \*